(12) United States Patent
Yang

(10) Patent No.: US 9,833,958 B2
(45) Date of Patent: Dec. 5, 2017

(54) METHOD FOR MANUFACTURING A SHOE SOLE WITH MULTI-MATERIAL SPIKES

(71) Applicant: Teng-Jen Yang, Taichung (TW)

(72) Inventor: Teng-Jen Yang, Taichung (TW)

( * ) Notice: Subject to any disclaimer, the term of this patent is extended or adjusted under 35 U.S.C. 154(b) by 276 days.

(21) Appl. No.: 14/821,811

(22) Filed: Aug. 10, 2015

(65) Prior Publication Data

US 2017/0043547 A1 Feb. 16, 2017

(51) Int. Cl.
| | |
|---|---|
| *B29C 45/14* | (2006.01) |
| *B29D 35/14* | (2010.01) |
| *A43B 5/00* | (2006.01) |
| *A43B 13/26* | (2006.01) |
| *B29C 45/16* | (2006.01) |
| *B29K 75/00* | (2006.01) |
| *B29K 621/00* | (2006.01) |

(52) U.S. Cl.
CPC .............. *B29D 35/142* (2013.01); *A43B 5/00* (2013.01); *A43B 13/26* (2013.01); *B29C 45/14* (2013.01); *B29C 45/1675* (2013.01); *B29K 2075/00* (2013.01); *B29K 2621/00* (2013.01)

(58) Field of Classification Search
None
See application file for complete search history.

(56) References Cited

U.S. PATENT DOCUMENTS

| | | | | | |
|---|---|---|---|---|---|
| 3,609,889 | A | * | 10/1971 | Calvin et al. | A43B 5/001 264/244 |
| 4,348,003 | A | * | 9/1982 | Beneteau | B29C 45/14778 249/142 |
| 4,787,156 | A | * | 11/1988 | Bade | B29D 35/081 12/142 T |
| 8,206,630 | B2 | * | 6/2012 | Sussmann | A43B 5/001 264/250 |
| 8,375,604 | B2 | * | 2/2013 | Eder | A43B 13/26 36/114 |
| 8,945,449 | B2 | * | 2/2015 | Atwal | A43C 15/161 264/242 |
| 2001/0011429 | A1 | * | 8/2001 | Peabody | A43B 5/001 36/134 |
| 2015/0208755 | A1 | * | 7/2015 | Rustam | A43B 5/001 36/127 |

* cited by examiner

*Primary Examiner* — Edmund Lee
(74) *Attorney, Agent, or Firm* — Bruce Stone LLP; Joseph Bruce

(57) ABSTRACT

A method for manufacturing a shoe sole with multi-material spikes includes: providing a spike-forming mold which includes an upper mold and a lower mold, wherein the lower mold includes a first filling hole which is in communication with the first spike cavity, different materials are placed in the first spike cavity to form the multi-material spike; providing a first mold which includes a second spike cavity; providing a second mold which includes a second filling hole; assembling the first and second molds, together to form a sole cavity, wherein the multi-material spike is placed into the sole cavity, a sole material is filled into the sole cavity through the second filling hole, and then the multi-material spike and the sole material are adhered to each other by hot melting; and opening the first and second molds, and obtaining a shoe sole with the multi-material spike.

7 Claims, 10 Drawing Sheets

METHOD FOR MANUFACTURING A SHOE SOLE WITH MULTI-MATERIAL SPIKES

BACKGROUND OF THE INVENTION

Field of the Invention

The present invention relates to a method for manufacturing a shoe sole, and more particularly to a method for manufacturing a shoe sole with multi-material spikes.

Related Prior Art

Shoe spikes are normally provided on the golf shoe sole in order to provide shock absorption and improve grip. As shown in FIG. 1, a shoe sole 10 is provided with a plurality of metal spikes 11 which are screwed onto the shoe sole 10, and then the shoe sole 10 is fixed to a shoe (not shown). However, this way of manufacturing is not only complicated but also is not suitable for mass production. Besides, torque will be produced onto the spikes 11 to cause rotation of the spikes 11 when a user wearing the shoes walks, as a result, the spikes 11 are likely to get loose from the shoe sole 10 after a certain period of time. Furthermore, metal nuts have to be embedded in the shoe sole 10 so that the spikes 11 can be screwed onto the shoe sole 10, which is likely to cause water seepage into the shoe sole 10.

Therefore, a method for manufacturing a shoe sole with plastic spikes was proposed, wherein the plastic spikes are made by plastic injection molding in order to reduce material cost while improving manufacturing efficiency. However, the shoe sole still has to be embedded with metal nuts during injection molding to allow for screwing of plastic spikes into the shoe sole. Therefore, the water seepage problem remains unsolved. Besides, the positions where the metal nuts are embedded are fixed and unchangeable, which means the distances between the spikes cannot be adjusted to meet different requirements of the user's.

Of course, there is another type of shoe sole with spikes, wherein the shoe sole is made of rubber while the spikes are made of plastic. Since the conditions and ways of forming the rubber and the plastic are different, the rubber and plastic have to be manufactured differently and then glued together. However, if the glue is not evenly applied, which will adversely affect the connection stability between shoe sole and the spikes.

Therefore, the configuration and structure of the existing spikes are limited due to the methods for making the spikes are the same. The spikes need to be screwed into the shoe sole and therefore have to be rotated, so that the spikes can be taken out during demolding process. However, the method for making the spikes has a great influence on the shape design of the spikes due to the fact that the spikes have to be arranged in a concentric circular array. Besides, in order for the spikes to be screwed into the shoe sole, the nuts must be embedded into the shoe sole before injection molding, which, however, will increase the thickness of the shoe sole.

The present invention has arisen to mitigate and/or obviate the afore-described disadvantages.

SUMMARY

One objective of the present invention is to provide a method for manufacturing a shoe sole with multi-material spikes, which is capable of solving the problem of the conventional shoe sole, wherein the spikes are assembled onto the shoe sole, the conventional shoe sole requires complicated manufacturing process, and has the problem of water seepage, bad stability and the positions of the conventional spikes are unadjustable.

Another objective of the present invention is to provide a method for manufacturing a shoe sole with multi-material spikes, wherein the multi-material spike is made of thermoplastic polyurethane and rubber material to improve grip.

Yet another objective of the present invention is to provide a method for manufacturing a shoe sole with multi-material spikes, which is capable of solving the disadvantage of the conventional shoe sole that the spikes are arranged in a concentric circular array, and the irregular shape of the spikes is unsuitable for mass production. The method of the present invention requires no embedding of nuts into the sole, therefore has no disadvantage of water seepage.

To achieve the above objectives, a method for manufacturing a shoe sole with multi-material spikes in accordance a preferred embodiment of the present invention comprises the following steps: a step (a) including providing a spike-forming mold which includes an upper mold and a lower mold, wherein the upper and lower molds are closed to define a first spike cavity, the lower mold is formed with a first filling hole which is in communication with the first spike cavity, one material is feed in the first spike cavity through the first filling hole against another material that was placed in the first spike cavity beforehand to form the multi-material spike; a step (b) including providing a first mold which includes a second spike cavity; a step (c) including providing a second mold which includes a second filling hole; a step (d) including assembling the first and second molds, together to form a sole cavity, wherein the multi-material spike is placed into the sole cavity, a sole material is filled into the sole cavity through the second filling hole which is in communication with the sole cavity, so that the sole material comes into contact with the multi-material spike that was placed into the sole cavity, and then the multi-material spike and the sole material are adhered to each other by hot melting; and a step (e) including opening the first and second molds, so as to form a shoe sole which is integrally formed with the multi-material spike.

Preferably, the multi-material spike is provided with a plurality of first spike portions and a plurality of second spike portions, and the first and second spike portions are made of different materials.

DETAILED DESCRIPTION

Figure 1:
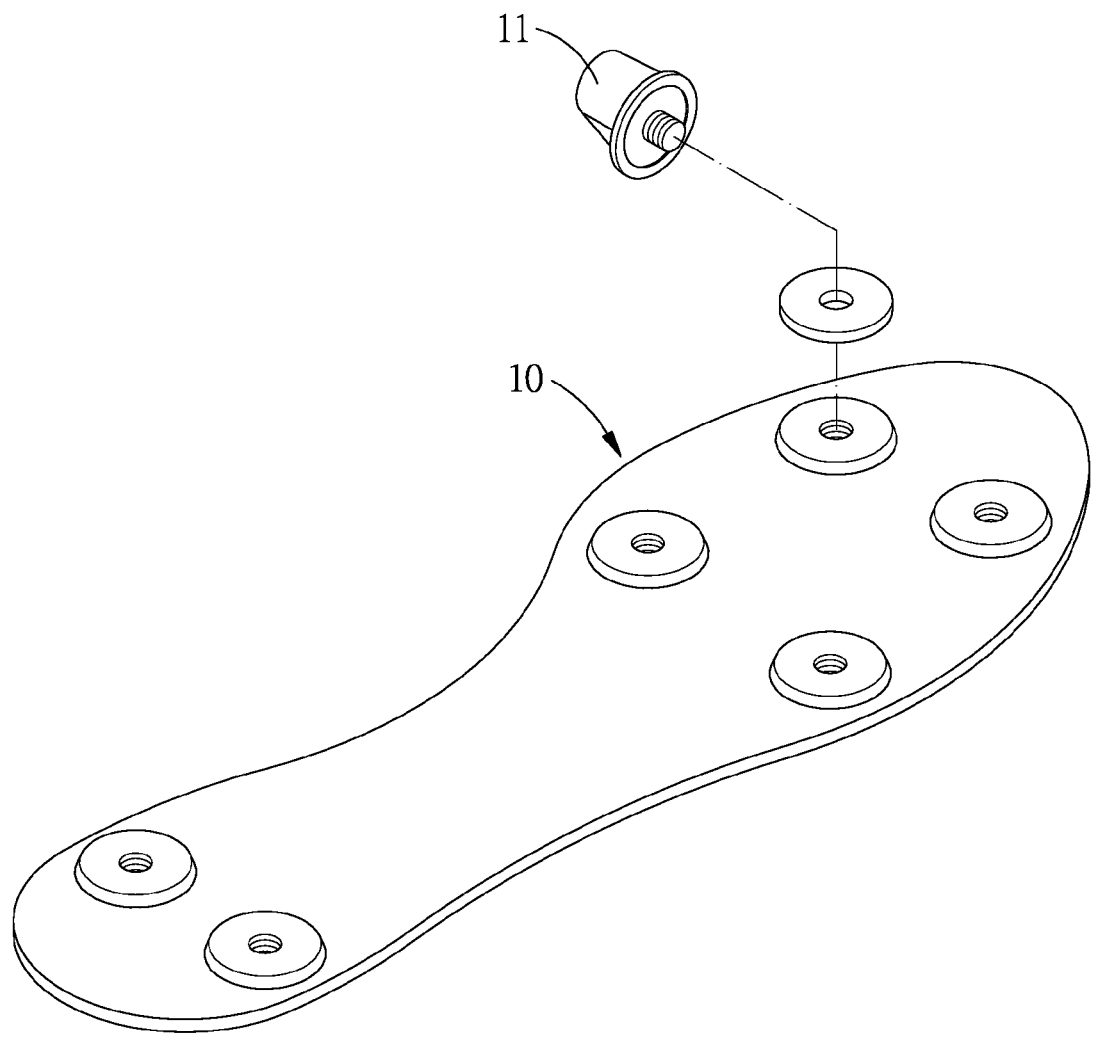
FIG. 1 is an exploded view of the conventional shoe sole and spike.

The present invention will be clearer from the following description when viewed together with the accompanying drawings, which show, for purpose of illustrations only, the preferred embodiment in accordance with the present invention.

Referring to FIGS. 2-8, a method for manufacturing a shoe sole with multi-material spikes of a preferred embodiment of the present invention comprises the following steps:

Step (a), as sown in FIGS. 2. 2A, 2B, 3A and 3B, includes providing a spike-forming mold 20 which includes an upper mold 21 and a lower mold 22. Between the upper and lower molds 21, 22 is formed a first spike cavity 23, then a rubber material R is filled into the first spike cavity, and the lower mold 22 is formed with a first filling hole 220 which is in communication with the first spike cavity 23.

Figure 2A:
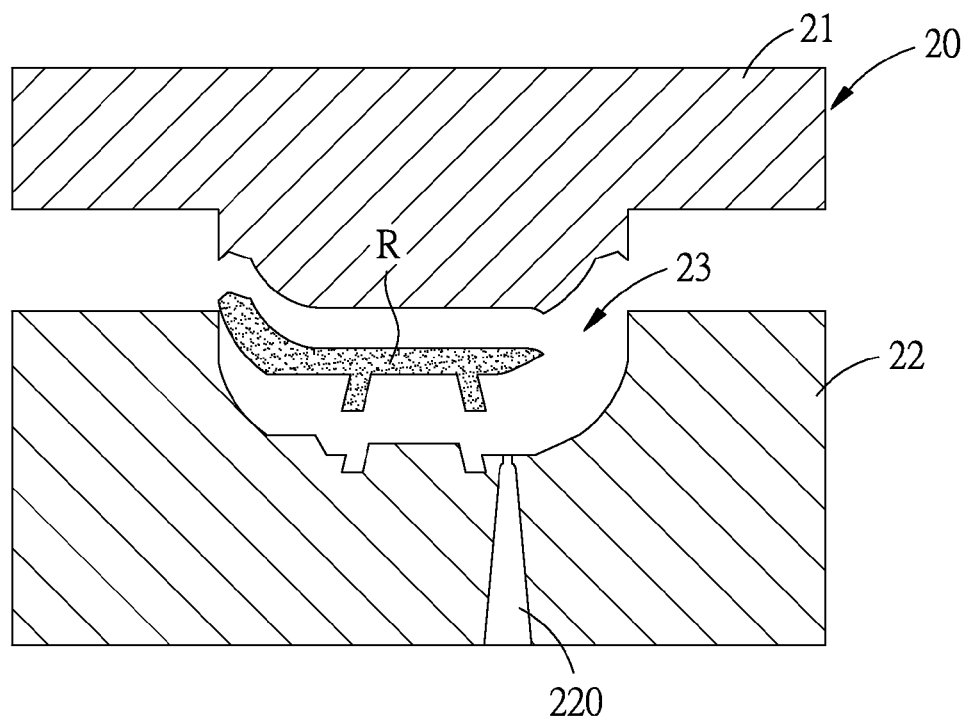
FIG. 2A is a first illustrative view of a method for manufacturing a shoe sole with multi-material spikes of a preferred embodiment of the present invention.
Figure 2B:
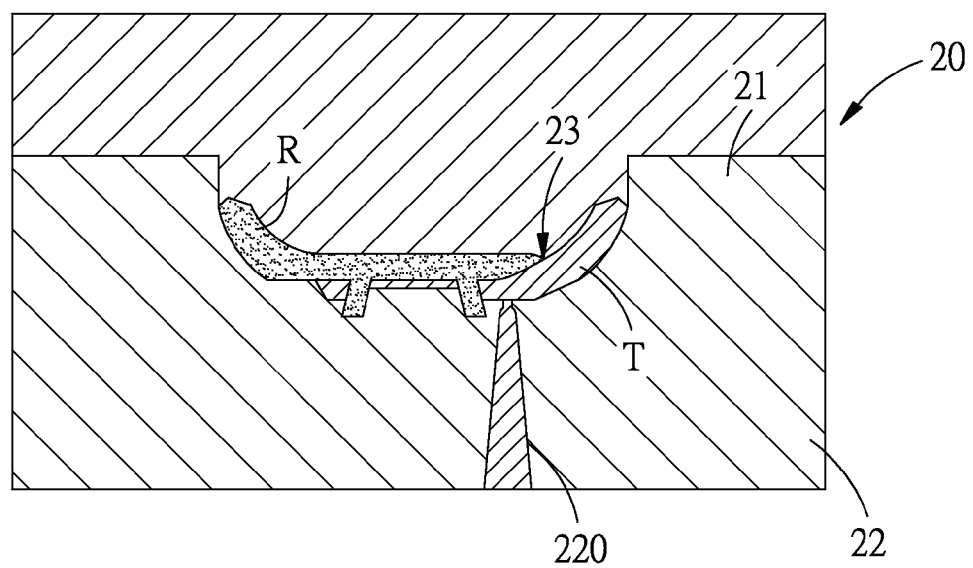
FIG. 2B is a second illustrative view of the method for manufacturing a shoe sole with multi-material spikes of a preferred embodiment of the present invention.
Figure 2C:
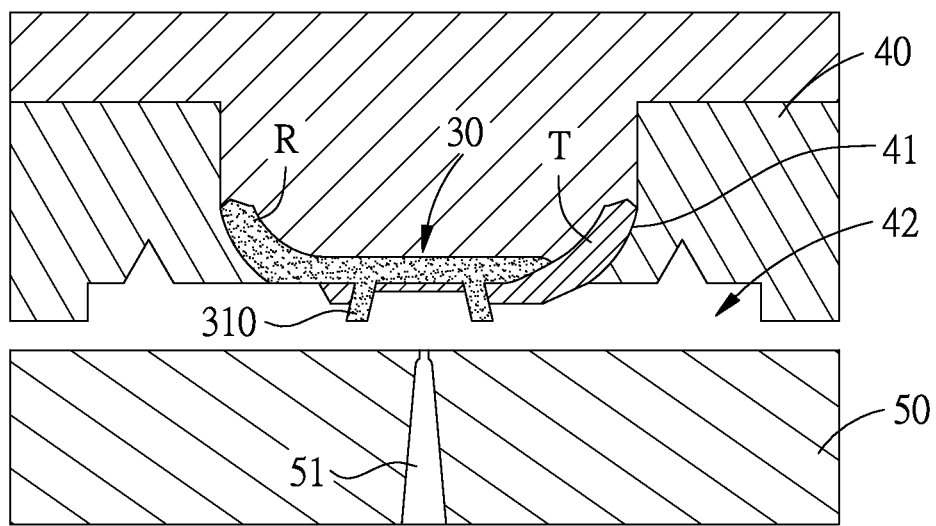
FIG. 2C is a third illustrative view of the method for manufacturing a shoe sole with multi-material spikes of a preferred embodiment of the present invention.
Figure 2D:
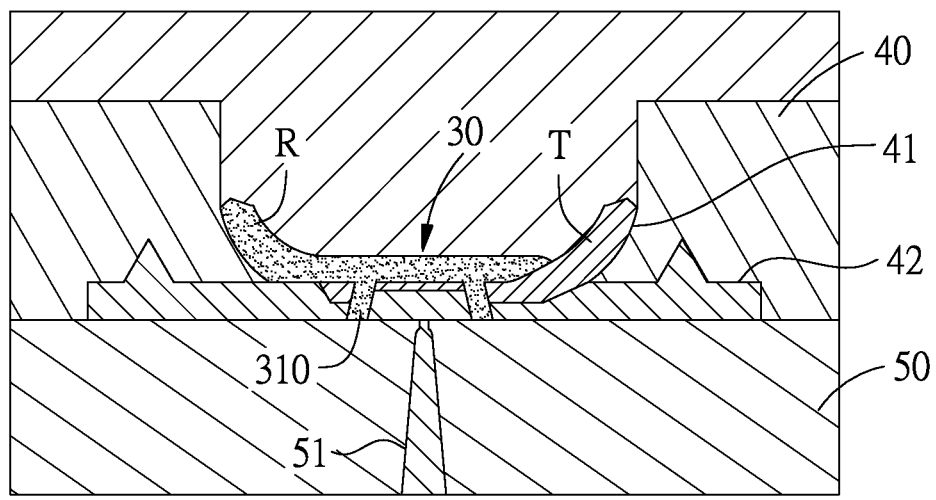
FIG. 2D is a fourth illustrative view of the method for manufacturing a shoe sole with multi-material spikes of a preferred embodiment of the present invention.
Figure 3A:
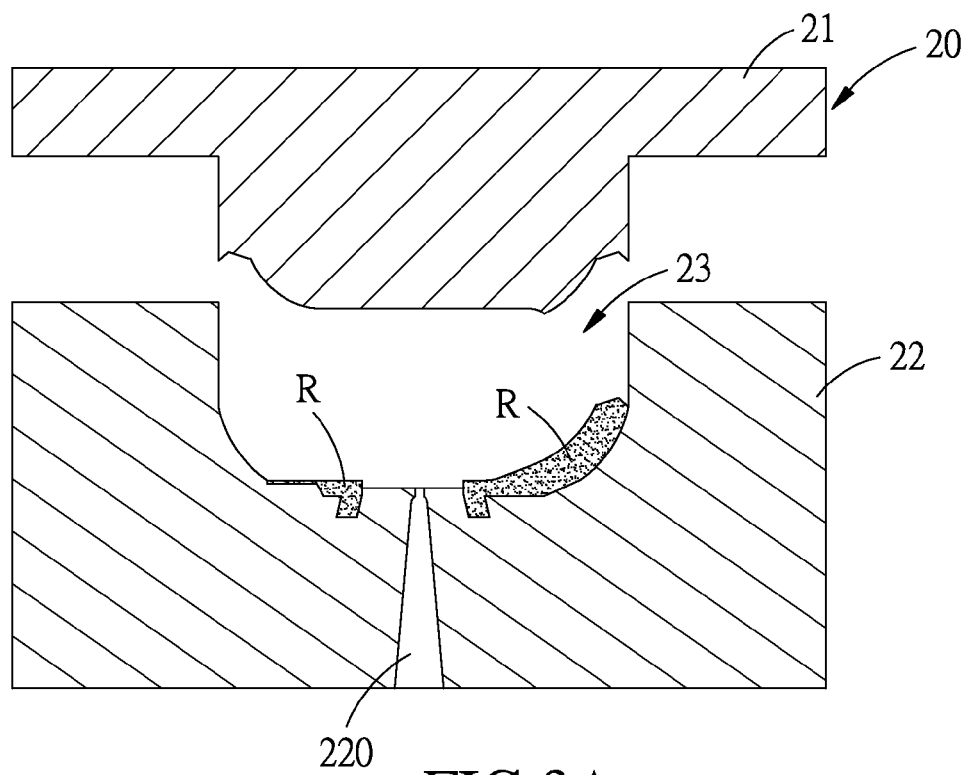
FIG. 3A is a first illustrative view of the method for manufacturing a shoe sole with multi-material spikes of another preferred embodiment of the present invention.
Figure 3B:
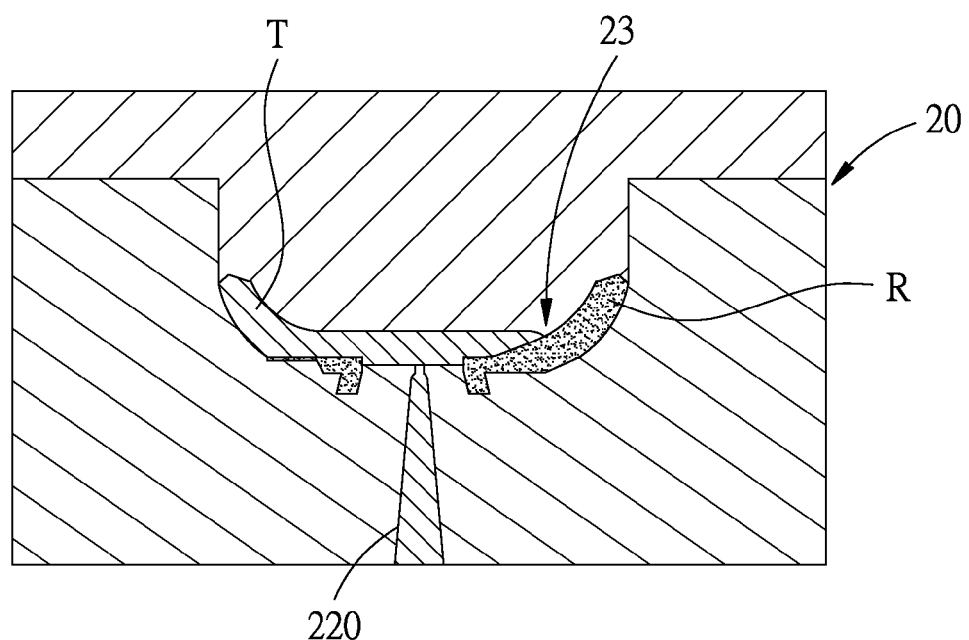
FIG. 3B is a second illustrative view of the method for manufacturing a shoe sole with multi-material spikes of another preferred embodiment of the present invention.
Figure 3C:
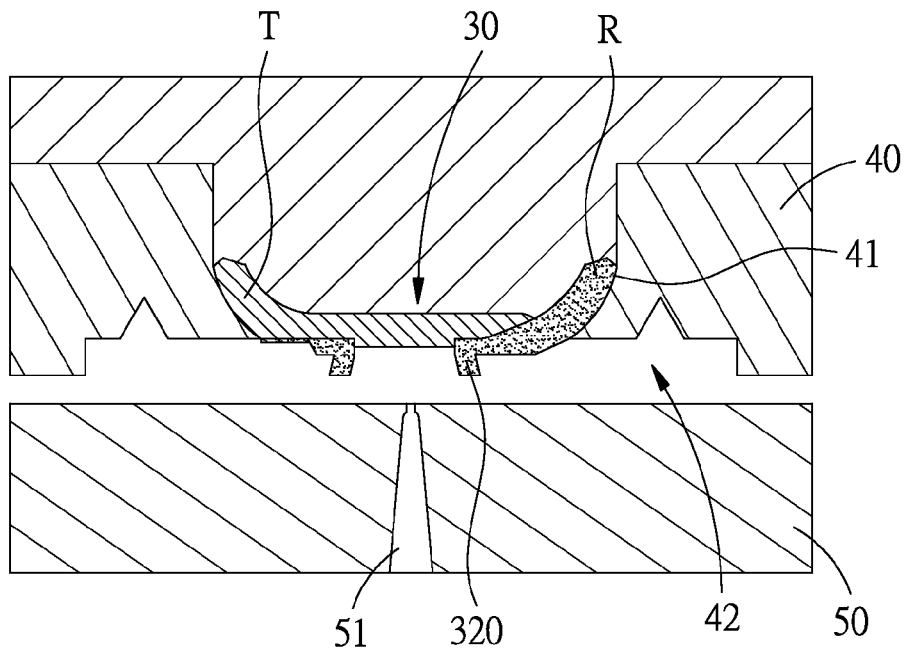
FIG. 3C is a third illustrative view of the method for manufacturing a shoe sole with multi-material spikes of another preferred embodiment of the present invention.
Figure 3D:
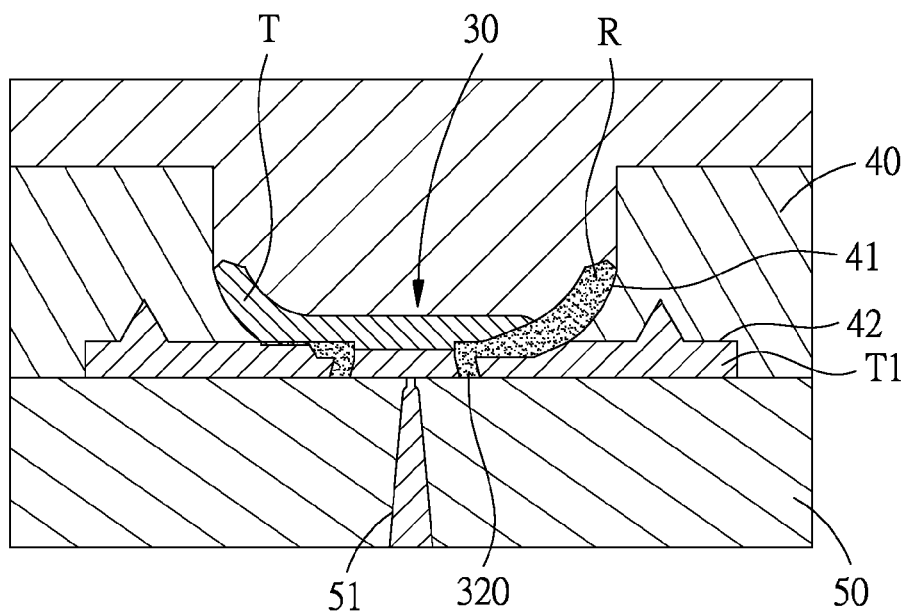
FIG. 3D is a fourth illustrative view of the method for manufacturing a shoe sole with multi-material spikes of another preferred embodiment of the present invention.

In the step (a), the method of the present invention allows different shaped rubber materials R to be placed in different positions in the first spike cavity 23, as shown in FIGS. 2A and 3A, then a thermoplastic polyurethane T is filled into the first spike cavity 23 through the first filling hole 220 (as shown in FIGS. 2B and 3B), and in the first spike cavity 23 the thermoplastic polyurethane T and the rubber material R are jointed to each other. However, the thermoplastic polyurethane T and the rubber material R cannot be hot melted (this is a well known technique and will therefore not be explained in detail), the conjunction surface between the thermoplastic polyurethane T and the rubber material R needs to be applied with glue (not shown) and then is heated so that the thermoplastic polyurethane T and the rubber material R can be glued to each other. Then, the upper and lower molds 21, 22 are opened to obtain a multi-material spike 30 which is provided with a plurality of first spike portions 31 and second spike portions 32, as shown in FIGS. 4 and 5.

Figure 4:
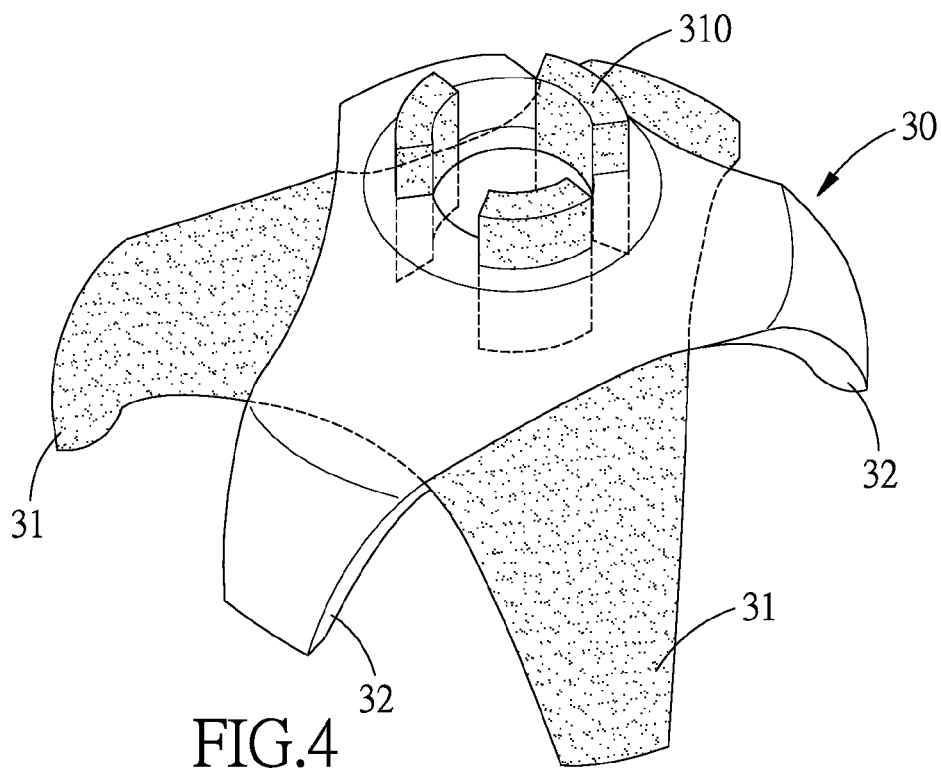
FIG. 4 is a perspective view of a multi-material spike of a preferred embodiment of the present invention.
Figure 5:
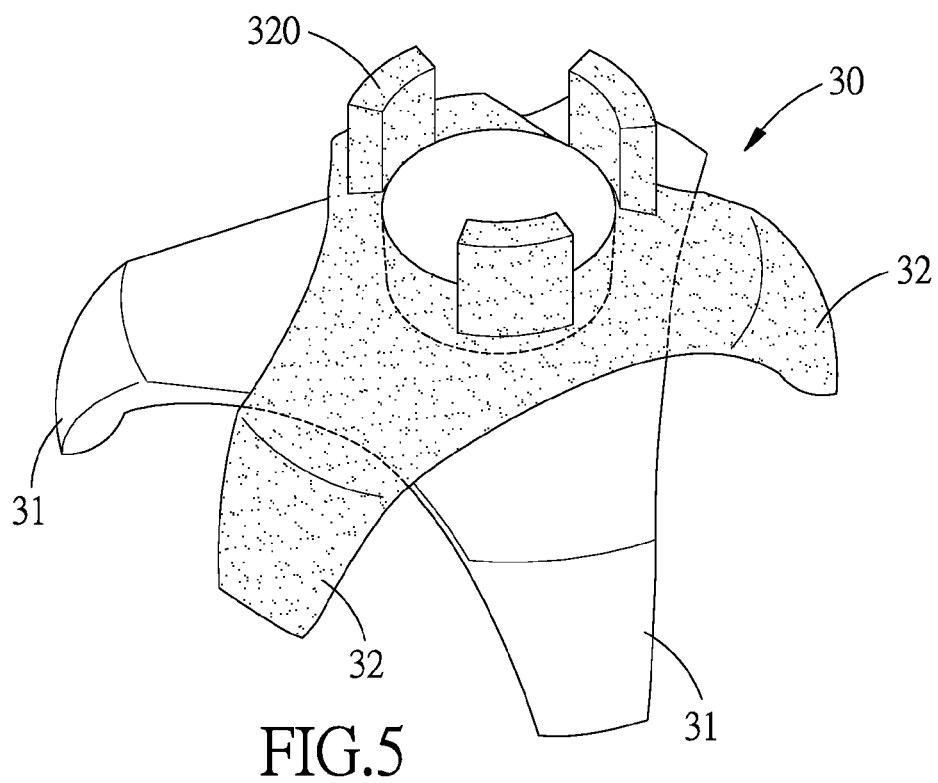
FIG. 5 is a perspective view of a multi-material spike of another preferred embodiment of the present invention.

Then, as shown in FIGS. 2A, 2B and 4, the first spike portions 31 of the spike 30 are made of the rubber material R and each include a plurality of gluing portions 310, while the second spike portions 32 are made of the thermoplastic polyurethane T. As shown in FIGS. 3A, 3B and 5, the first spike portions 31 of the spike 30 are made of the thermoplastic polyurethane T, while the second spike portions 32 are made of the rubber material R and each include a plurality of gluing portions 320. The gluing portions 310, 320 improve the adhering force between the thermoplastic polyurethane T and the rubber material R.

Referring then to FIGS. 2C, 2D, 3C and 3D, a step (b) includes providing a first mold 40 which includes a second spike cavity 41; a step (c) includes providing a second mold 50 which includes a second filling hole 51.

A step (d) includes assembling the first and second molds 40, 50 together to form a sole cavity 42, and the multi-material spike 30 is placed into the sole cavity 42. A sole material T1 (which is thermoplastic polyurethane T) is filled into the sole cavity 42 through the second filling hole 51 which is in communication with the sole cavity 42, and then the multi-material spike 30 and the sole material T1 are adhered to each other by hot melting. The gluing portions 310, 320 improve the adhering force between the sole material T1 (which is thermoplastic polyurethane T) and the rubber material R of the shoe sole 60.

Figure 2E:
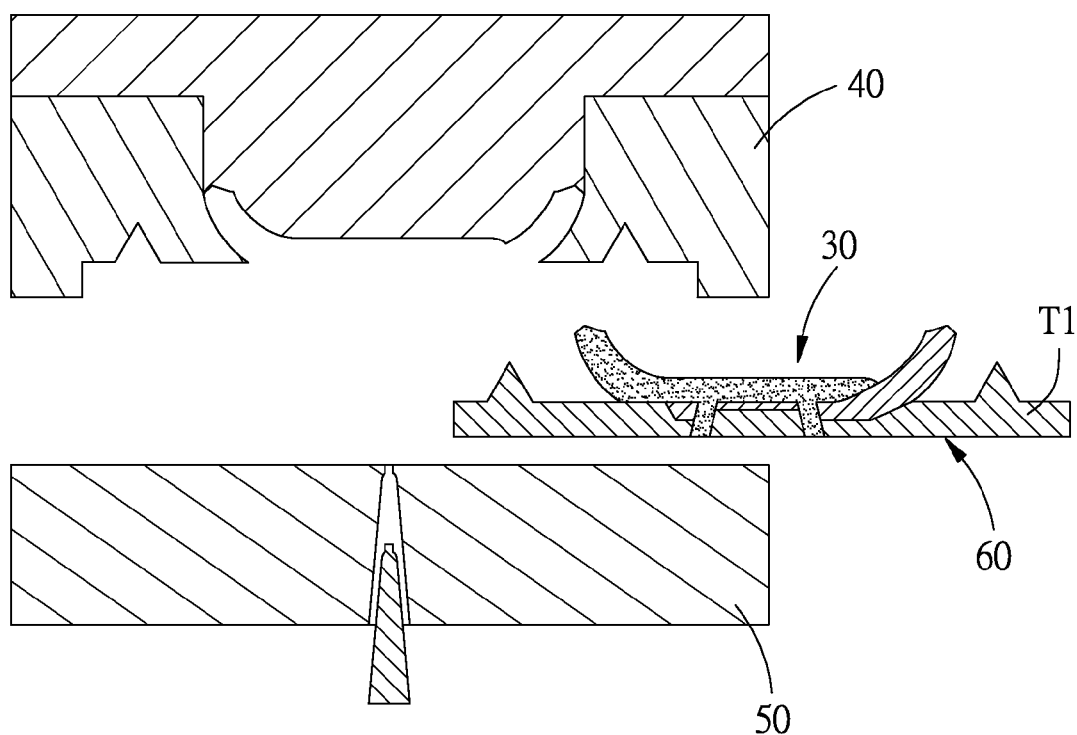
FIG. 2E is a fifth illustrative view of the method for manufacturing a shoe sole with multi-material spikes of a preferred embodiment of the present invention.
Figure 3E:
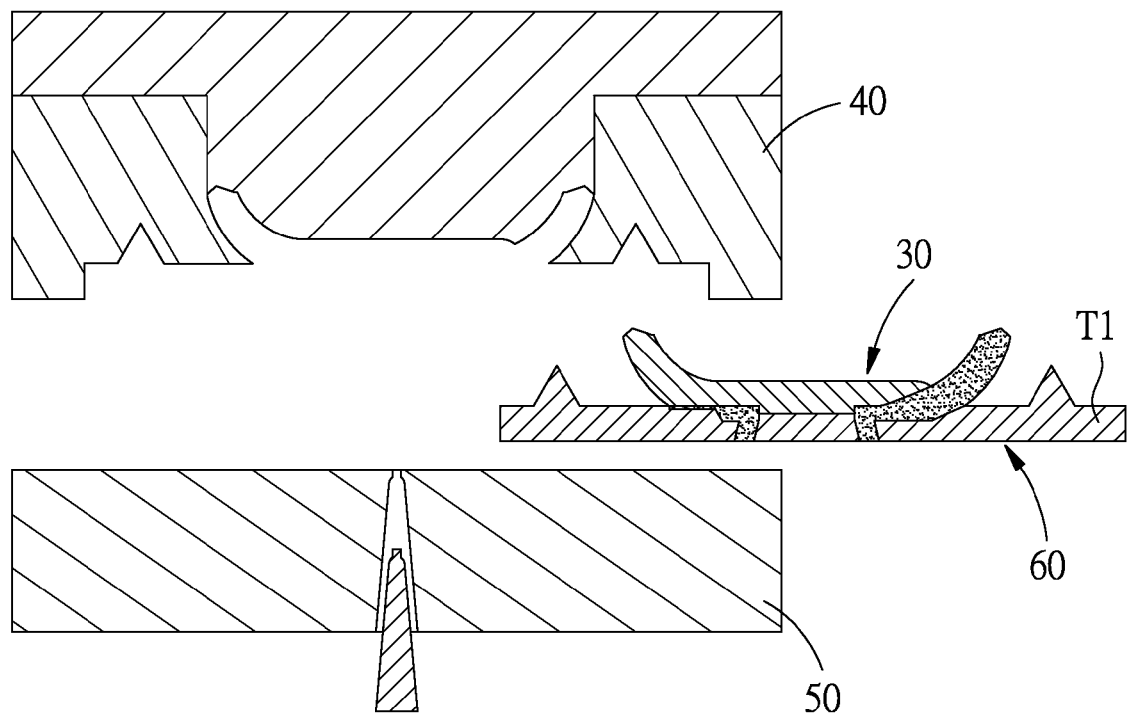
FIG. 3E is a fifth illustrative view of the method for manufacturing a shoe sole with multi-material spikes of another preferred embodiment of the present invention.

Referring then to FIGS. 2E and 3E, a final step (e) includes opening the first and second molds 40, 50 after a certain period of time, so that the sole material T1 in the sole cavity 42 is formed into a shoe sole 60 which is integrally formed with the multi-material spike 30.

It is learned from the steps (a) to (e) that the multi-material spike 30 is preformed and the first and second spike portions 31, 32 are made of two different materials, for example, the first and second spike portions 31, 32 in the step (a) are made of rubber material R and thermoplastic polyurethane T, respectively. Then, the multi-material spike 30 is positioned in the second spike cavity 41 of the first mold 40, and the sole material T1 is injected into the sole cavity 42 to form the shoe sole 60 with the multi-material spike 30 by injection molding process.

Figure 6:
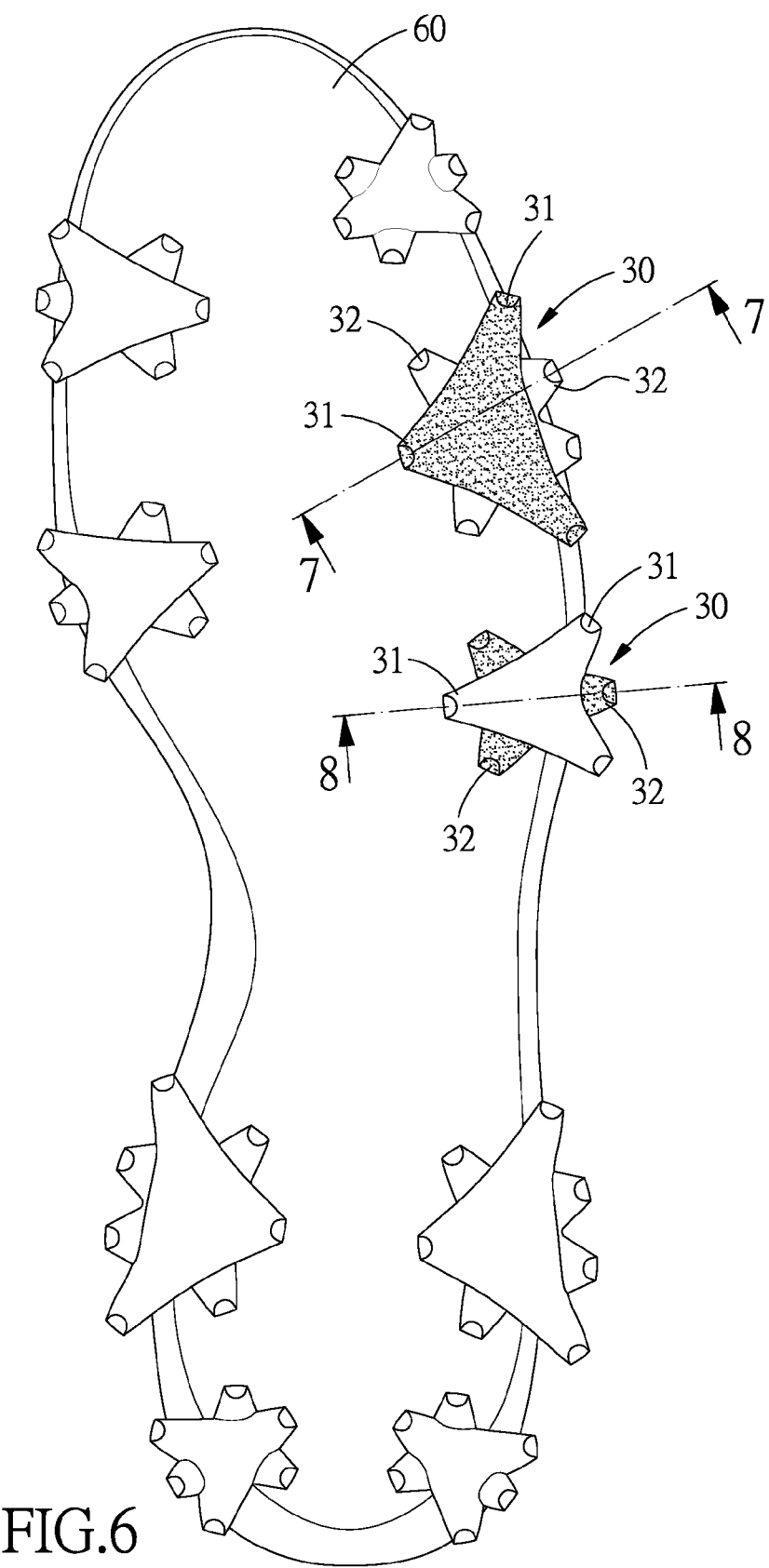
FIG. 6 is an illustrative view of a shoe sole which is integrally formed with multi-material spikes of a preferred embodiment of the present invention.
Figure 7:
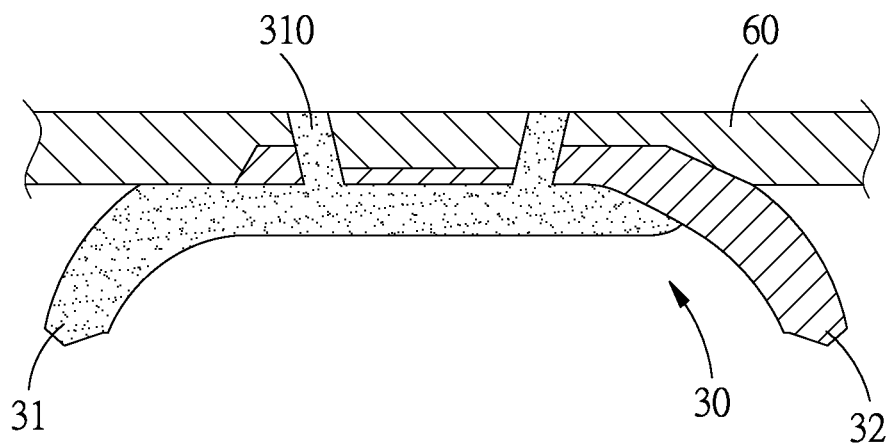
FIG. 7 is a cross sectional view taken along the line 7-7 of FIG. 6.
Figure 8:
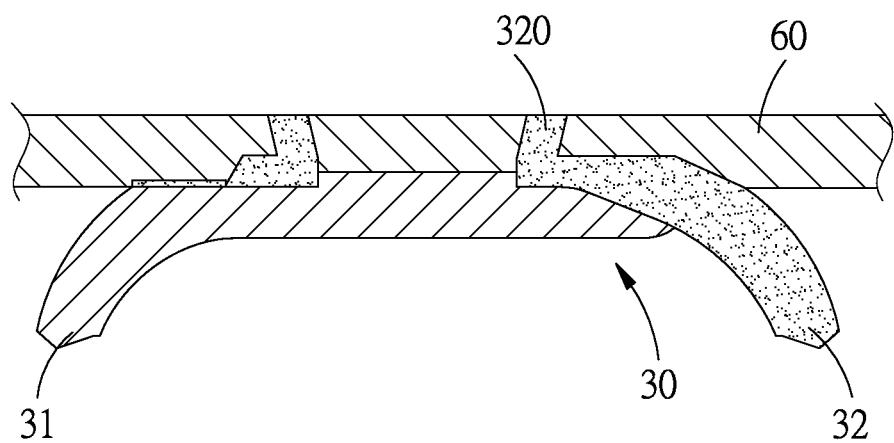
FIG. 8 is a cross sectional view taken along the line 8-8 of FIG. 8.

Referring then to FIGS. 6-8, distances between the neighboring first and second spike portions 31, 32 of the multi-material spike 30 are different. For example, as shown in FIG. 6, the first and second spike portions 31, 32 at the outer edge of the shoe sole 60 are spaced at a distance narrower than that between the first and second spike portions 31, 32 at the inner edge of the shoe sole 60. The materials of the first and second spike portions 31, 32 can be chosen as desired. For example, the rubber material R is wear resisting and anti-skipping, while the thermoplastic polyurethane T is elastic in addition to being wear resisting and anti-skipping. Besides, since the first and second spike portions 31, 32 are spaced at different distances, which can enhance grip and improve balance of the wearer.

While we have shown and described various embodiments in accordance with the present invention, it is clear to those skilled in the art that further embodiments may be made without departing from the scope of the present invention.

What is claimed is:

1. A method for manufacturing a shoe sole with multi-material spikes, comprising:
  (a) providing a spike-forming mold which includes an upper mold and a lower mold, wherein the upper and lower molds are assembled to form a first spike cavity therebetween, and the lower mold is formed with a first filling hole which is in communication with the first spike cavity, and then feeding one material in the first spike cavity through the first filling hole against another material that was placed in the first spike cavity beforehand to form a multi-material spike;
  (b) providing a first mold which includes a second spike cavity;

(c) providing a second mold which includes a second filling hole;

(d) assembling the first and second molds, together to form a sole cavity, placing the multi-material spike into the sole cavity, providing a sole material into the sole cavity through the second filling hole which is in communication with the sole cavity, so that the sole material comes into contact with the multi-material spike that was placed into the sole cavity, and then adhering the multi-material spike to the sole material by hot melting; and (e) opening the first and second molds, so that the sole material in the sole cavity is formed into a shoe sole which is integrally formed with the multi-material spike, and the multi-material spike is provided with a plurality of first spike portions and a plurality of second spike portions, and a distance between the first and second spike portions at an outer edge of the shoe sole is different from that between the first and second spike portions at an inner edge of the shoe sole.

2. The method for manufacturing the shoe sole as claimed in claim 1, wherein the sole material is thermoplastic polyurethane.

3. The method for manufacturing the shoe sole as claimed in claim 1, further comprising the step of placing a rubber material into the first spike cavity, and then providing thermoplastic polyurethane into the first spike cavity through the first filling hole to be adhered to the rubber material in the step (a).

4. The method for manufacturing the shoe sole as claimed in claim 3, wherein the rubber materials is placed in different positions in the first spike cavity.

5. The method for manufacturing the shoe sole as claimed in claim 1, wherein the first and second spike portions at the outer edge of the shoe sole are spaced at a distance narrower than the distance between the first and second spike portions at the inner edge of the shoe sole.

6. The method for manufacturing the shoe sole as claimed in claim 5, wherein the first spike portions are made of thermoplastic polyurethane, and the second spike portions are made of rubber material.

7. The method for manufacturing the shoe sole as claimed in claim 5, wherein the second spike portions are made of thermoplastic polyurethane, and the first spike portions are made of rubber material.

* * * * *